Jan. 2, 1968       H. H. KOEHL       3,361,175
CLINCH NUT WITH ROTATION PREVENTING MEANS
Filed Feb. 7, 1966
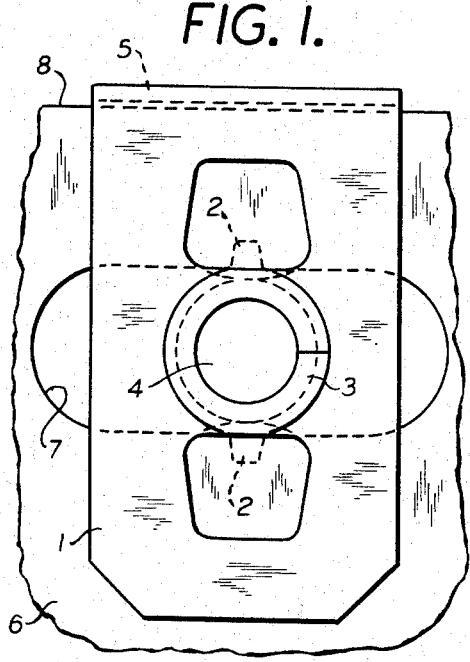
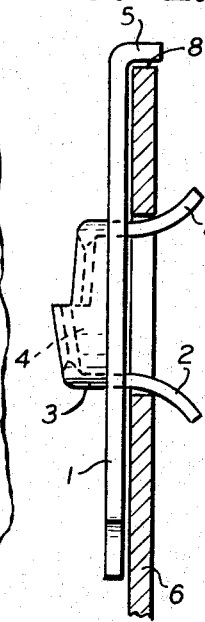
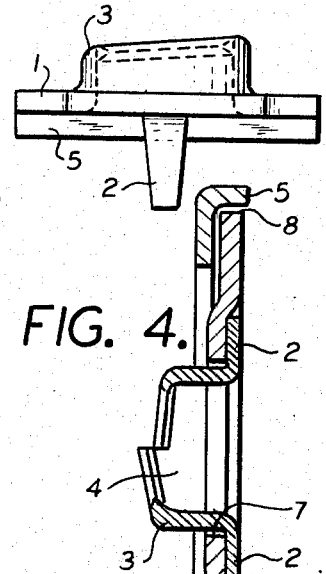
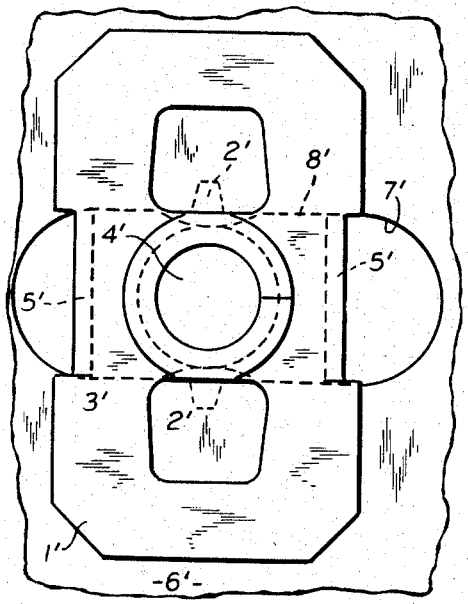
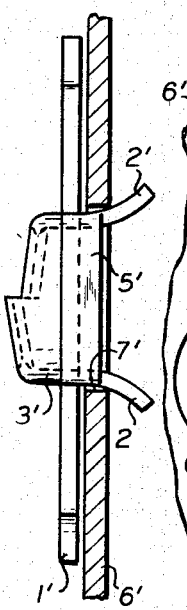
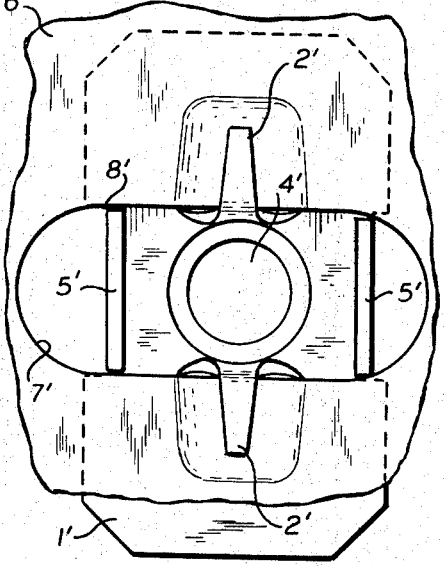
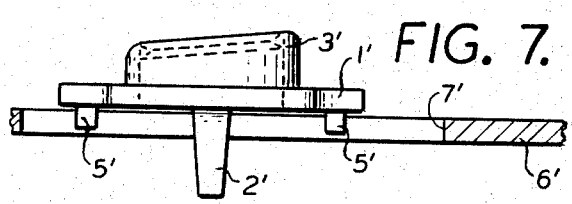
INVENTOR.
HANS H. KOEHL
BY
ATTORNEY.

United States Patent Office 3,361,175
Patented Jan. 2, 1968

3,361,175
CLINCH NUT WITH ROTATION PREVENTING MEANS
Hans H. Koehl, Brooklyn, Conn., assignor to C.E.M. Company, Inc., Danielson, Conn., a corporation of Connecticut
Filed Feb. 7, 1966, Ser. No. 525,730
1 Claim. (Cl. 151—41.72)

The present invention relates to snap-on nuts.

It is one object of the present invention to provide snap-on nuts which do not require special installation tools.

It is another object of the present invention to provide snap-on nuts which cannot rotate with respect to a plate, to which the snap-on nut is to be attached, while partially installed, thus permitting a floating effect created as a result of an elongated hole provided in the plate.

It is still another object of the present invention to provide snap-on nuts, wherein the completely installed snap-on nuts do not project beyond the plate on the opposite side of the nuts.

It is yet another object of the present invention to provide snap-on nuts, wherein, as soon as the insertion of a bolt into the nut engages a prong of the nut and the interlocking or weaving effect starts, the torque of the edge of a plate or hole therein is relieved and a further tightening of the bolt or of the screw does not put an increased concentrated stress on the plate but reduces it, thereby permitting the use of thinner plates.

It is a further object of the present invention to provide snap-on nuts, adjustably secured to a panel, the position of which nuts is permanently fixed on the panel upon mating the nuts with a bolt.

It is yet a further object of the present invention to provide snap-on nuts which are capable of being secured, but adjustably, locked to a plate before the installation of a bolt, thereby eliminating any danger of loss during assembly.

It is also a further object of the present invention to provide snap-on nuts, which, due to their specific design, require less material, permitting economical manufacture.

It is additionally an object of the present invention to provide snap-on nuts which float easier in an elongated hole of a plate, to which the nuts are to be secured.

With these and other objects in view, which will become apparent in the following detailed description, the present invention will be clearly understood in connection with the accompanying drawings, in which:

FIGURE 1 is an elevation of a snap-on nut mounted on a plate;

FIG. 2 is a side view of the snap-on nut disclosed in FIG. 1;

FIG. 3 is an end view of the snap-on nut disclosed in FIG. 1;

FIG. 4 is a sectional view of the snap-on nut in its position mounted on a panel after complete installation;

FIG. 5 is an elevation of another embodiment of a snap-on nut mounted on a plate;

FIG. 6 is a side view of the snap-on nut disclosed in FIG. 5;

FIG. 7 is an end view of the snap-on nut disclosed in FIG. 6; and

FIG. 8 is a bottom plan view of the snap-on nut disclosed in FIG. 5, but completely installed on the panel.

Referring now to the drawings and in particular to FIGS. 1 to 4, the snap-on nut comprises a flange member 1 from which two oppositely disposed prongs 2 are cut out and partially pre-bent in a predetermined manner in an outwardly radial direction, to assume a position in which they would normally be after partial installation on a panel, and permitting adjustment movement of the nut relative to the panel.

Snap-on nuts are intended to be locked into an opening in a panel part for subsequent assembly. It is an essential requirement of such nuts that they be firmly retained in the opening against the possibility of accidental dislodgment. This is particularly true because the utility of such snap-on nuts is primarily in assembly operations in which the nut may be inaccessible during final assembly.

For similar reasons it is essential that the nut be constructed and arranged to prevent being drifted out of or turned relative to the opening as a bolt is tightened in the nut.

A thread carrying portion 3 of the nut is formed integrally of the flange member to form a bolt opening 4. At least one tab 5 is provided on one end of the flange member 1 by bending downwardly an edge perpendicularly to the plane of the flange member 1.

A panel 6 having an elongated hole 7 receives the nut by inserting the prongs 2 into the hole 7 of the panel 6 and the tab 5 engages the edge of the panel 6. The elongated hole 7 is disposed substantially parallel to and a predetermined distance from the edge of the panel 6. The nut is placed on top of the hole 7 with the pre-bent prongs 2 in the hole 7 and pointing in the long direction thereof. The nut is then twisted 90°, so that the bent-down tab 5 engages the edge 8 of the panel 6, whereby rotation of the nut is prevented.

The partially spread prongs 2 are now in line with the short direction of the hole 7 and are bent further to engage the panel 6 and to hold the nut thereto, as a mating member is attached to the panel 6 by means of a screw or bolt (not shown), the prongs 2 continue to spread and a final installation is completed, as disclosed in FIG. 4.

Referring now again to the drawing and in particular to FIGS. 5 to 8, a second embodiment of the snap-on nut is disclosed, which is particularly applicable where the panel does not have a close edge formation.

The snap-on nut according to this embodiment comprises again a flange member 1' from which two oppositely disposed prongs 2' are bent out and again partially pre-bent in a predetermined manner in an outwardly radial direction, to assume a position, in which they would normally be after partial installation on a panel.

A thread carrying portion 3' of the nut is integrally formed of the flange member 1' to form a bolt opening 4'. Tabs 5' are arranged centrally and equal in length to the distance between the outside face of the prongs 2' at their point of attachment to the flange member 1' on opposite sides of the nut and are bent downwardly to form an edge perpendicular to the plane of the flange member 1'.

A panel 6' having an elongated hole 7' receives again the nut by inserting the prongs 2' into the hole 7' of the panel 6' and the tabs 5' engage now the longitudinal edges 8' of the hole 7'. The nut is placed with the pre-bent prongs 2' in the hole 7' and is guided in the latter by means of the tabs 5', and pointing in the long direction thereof. The nut is then twisted 90°, so that the bent-down tabs 5' engage the edge 8' of the hole 7', whereby rotation of the nut is prevented.

The partially spread prongs now are in line with the short direction of the hole 7' and are bent further to engage the panel 6' and to hold the nut thereto, as a mating member is attached to the panel 6' by means of a screw or bolt (not shown), the prongs 2' continue to spread and a final installation is completed, as disclosed in FIG. 8.

While I have disclosed several embodiments of the present invention, it is to be understood that these embodiments are given by example only and not in a limiting sense, the scope of the present invention being determined by the objects and the claims.

I claim:
1. A snap-on nut, comprising
a flange member defining a body portion having a bolt opening,
two attaching prongs projecting integrally from said flange member on one side of said bolt opening,
said nut being adapted to be installed on a panel having a slot and the latter receiving said prongs therethrough, so that the latter upon further bending engage one face of said panel and secure said nut to said panel,
tab means formed integrally with and bent substantially perpendicularly to the plane of said flange member to engage a complementary edge formation of said panel, in order to prevent rotation of said nut relative to said panel, and
said tab means comprising portions of said flange member bent over for about 90° and disposed centrally and equal in length to the distance between the outside face of said prongs at their point of attachment to said flange member on opposite sides of said nut.

References Cited

UNITED STATES PATENTS

| | | | |
|---|---|---|---|
| 3,304,980 | 2/1967 | Koehl | 85—32 |
| 1,320,006 | 10/1919 | Higgs | 151—42 |
| 1,502,399 | 7/1924 | Renner | 85—32 |
| 1,873,869 | 8/1932 | Carr | 151—41.72 |
| 2,080,545 | 5/1937 | Ross | 151—41.72 |
| 2,146,128 | 2/1939 | Oldham | 151—41.72 |
| 2,233,242 | 2/1941 | Quarnstrom | 10—86 |
| 2,281,700 | 5/1942 | Langmaid | 151—41.74 |
| 2,724,419 | 11/1955 | Poupitch | 151—41.74 |
| 2,804,180 | 8/1957 | Richardson | 151—41.74 |

MARION PARSONS, Jr., *Primary Examiner.*